(12) United States Patent
Shafaat et al.

(10) Patent No.: US 8,566,012 B1
(45) Date of Patent: Oct. 22, 2013

(54) ON-BOARD AIRCRAFT SYSTEM AND METHOD FOR ACHIEVING AND MAINTAINING SPACING

(75) Inventors: Syed Tahir Shafaat, Everett, WA (US); David S. Yotsuuye, Renton, WA (US); Tan N. Che, Federal Way, WA (US); Minh-Tri Le, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 428 days.

(21) Appl. No.: 12/795,956

(22) Filed: Jun. 8, 2010

(51) Int. Cl.
*G08G 1/00* (2006.01)

(52) U.S. Cl.
USPC ............... 701/120; 701/4; 701/91; 701/93; 701/116; 701/121

(58) Field of Classification Search
USPC .................. 701/4, 116, 91, 93, 120, 121
See application file for complete search history.

(56) References Cited

U.S. PATENT DOCUMENTS

| | | | | |
|---|---|---|---|---|
| 6,926,233 | B1 * | 8/2005 | Corcoran, III | 244/76 R |
| 7,778,768 | B2 * | 8/2010 | Barry et al. | 701/120 |
| 8,108,088 | B2 * | 1/2012 | Closse et al. | 701/16 |
| 8,108,133 | B2 * | 1/2012 | Haissig | 701/116 |
| 8,255,147 | B2 * | 8/2012 | Roberts et al. | 701/120 |
| 2002/0154061 | A1 * | 10/2002 | Frazier et al. | 342/455 |
| 2003/0122701 | A1 * | 7/2003 | Tran | 342/29 |
| 2005/0156777 | A1 * | 7/2005 | King et al. | 342/29 |
| 2005/0165516 | A1 * | 7/2005 | Haissig et al. | 701/4 |
| 2005/0230563 | A1 * | 10/2005 | Corcoran, III | 244/175 |
| 2007/0132638 | A1 * | 6/2007 | Frazier et al. | 342/455 |
| 2007/0198170 | A1 * | 8/2007 | Barry et al. | 701/120 |
| 2007/0299611 | A1 * | 12/2007 | Winkler et al. | 701/301 |
| 2008/0103646 | A1 * | 5/2008 | Lucas et al. | 701/14 |
| 2008/0177432 | A1 * | 7/2008 | Deker et al. | 701/17 |
| 2009/0005960 | A1 * | 1/2009 | Roberts et al. | 701/120 |
| 2009/0012660 | A1 * | 1/2009 | Roberts et al. | 701/3 |
| 2009/0153343 | A1 | 6/2009 | Shafaat et al. | |
| 2009/0157287 | A1 | 6/2009 | Shafaat et al. | |
| 2009/0171519 | A1 * | 7/2009 | Closse et al. | 701/16 |

\* cited by examiner

*Primary Examiner* — James Trammell
*Assistant Examiner* — Truc M Do
(74) *Attorney, Agent, or Firm* — Charles L. Moore; Moore & Van Allen PLLC (57) ABSTRACT

A method for achieving and maintaining spacing between aircraft may include receiving by a following aircraft information related to a lead aircraft. The information is useable for achieving and maintaining spacing by the following aircraft from the lead aircraft. The method may also include determining spacing of the following aircraft from the lead aircraft. The method may additionally include receiving by the following aircraft a vertical profile for the traffic management environment. The method may further include automatically controlling throttle settings to achieve and maintain spacing by the following aircraft from the lead aircraft while maintaining the vertical profile of the following aircraft in response to an automatic spacing mode being enabled.

25 Claims, 4 Drawing Sheets

ON-BOARD AIRCRAFT SYSTEM AND METHOD FOR ACHIEVING AND MAINTAINING SPACING

FIELD

The present disclosure relates to aerospace vehicles or aircraft and avionics for interfacing with such vehicles, and more particularly to an on-board aircraft system and method for achieving and maintaining spacing.

BACKGROUND

The development and implementation of Automatic Dependent Surveillance-Broadcast (ADS-B) technology around the world is expected to provide more operationally efficient airspace. In this environment, aircraft would be able to change their flight level during cruise in oceanic and procedural airspace for optimum flight level for better fuel consumption (better airplane performance), favorable winds (e.g. better tail wind), to avoid turbulence or due to presence of weather at the current flight level, and for other reasons. The ADS-B technology is also envisioned to provide enhanced Air Traffic Management (ATM) in air space environments, such as busy airports to allow aircraft to follow one another at a controlled and monitored spacing to increase air space capacity and efficiency. However, there are no known currently existing flight deck or cockpit tools that would assist a flight crew to initially achieve a required or ATM instructed spacing from a lead aircraft and to maintain this spacing in an ATM environment using an ADS-B application or similar technology and while also maintaining a vertical path of the flight plan or vertical profile.

SUMMARY

In accordance with an embodiment, a method for achieving and maintaining spacing between aircraft may include receiving by a following aircraft information related to a lead aircraft. The information is useable for achieving and maintaining spacing by the following aircraft from the lead aircraft in an. The method may also include determining spacing of the following aircraft from the lead aircraft. The method may additionally include receiving by the following aircraft a vertical profile for the traffic management environment. The method may further include automatically controlling throttle settings to achieve and maintain spacing by the following aircraft from the lead aircraft while maintaining the vertical profile of the following aircraft in response to an automatic spacing mode being enabled.

In accordance with another embodiment, an on-board system for achieving and maintaining spacing between aircraft may include a receiver for receiving information related to a lead aircraft. The information is useable for achieving and maintaining spacing by a following aircraft from the lead aircraft. The on-board system may also include a processor. A module operating on the processor may determine spacing of the following aircraft from the lead aircraft. An auto-throttle module operating on the processor may automatically control throttle settings to achieve and maintain spacing while maintaining a vertical profile of the following aircraft in response to an automatic spacing mode being enabled.

In accordance with another embodiment, an aircraft may include an airframe and an on-board system for achieving and maintaining spacing between aircraft. The on-board system may include a receiver for receiving information related to a lead aircraft. The information is useable for achieving and maintaining spacing by the aircraft from the lead aircraft. The on-board system may also include a processor. A module may operate on the processor to determine spacing of the aircraft from the lead aircraft. An auto-throttle module may operate on the processor to automatically control throttle settings to achieve and maintain spacing by the aircraft from the lead aircraft while maintaining a vertical profile of the aircraft in response to an automatic spacing mode being enabled.

In accordance with another embodiment, a computer program product for achieving and maintaining spacing between aircraft may include a computer readable storage medium. The computer readable storage medium may have computer readable program code embodied therewith. The computer readable program code may include computer readable program code configured to receive by a following aircraft information related to a lead aircraft. The information is useable for achieving and maintaining spacing by the following aircraft from the lead aircraft. The computer readable program code may also include computer readable program code configured to determine spacing of the following aircraft from the lead aircraft. The computer readable program code may also include computer readable program code configured to receive by the following aircraft a vertical profile for the traffic management environment. The computer readable program code may also include computer readable program code configured to automatically control throttle settings to achieve and maintain spacing by the following aircraft from the lead aircraft while maintaining the vertical profile of the following aircraft in response to an automatic spacing mode being enabled.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE SEVERAL VIEWS OF THE DRAWINGS

The following detailed description of embodiments refers to the accompanying drawings, which illustrate specific embodiments of the disclosure. Other embodiments having different structures and operations do not depart from the scope of the present disclosure.

DESCRIPTION

The following detailed description of embodiments refers to the accompanying drawings, which illustrate specific embodiments of the disclosure. Other embodiments having different structures and operations do not depart from the scope of the present disclosure.

As will be appreciated by one of skill in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
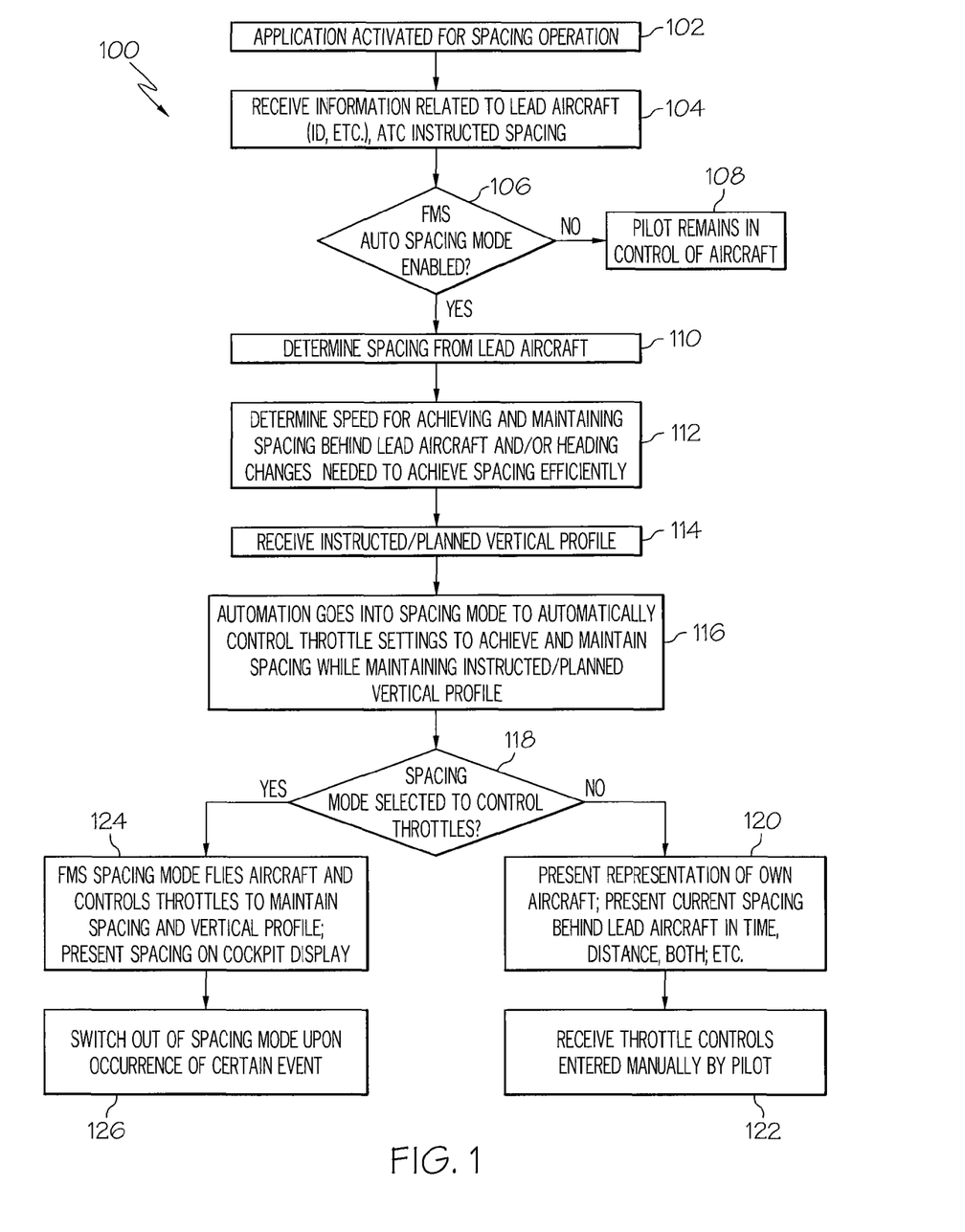
FIG. 1 is a flow chart of an example of a method for achieving and maintaining spacing between aircraft in accordance with an embodiment of the present disclosure.

FIG. 1 is a flow chart of an example of a method 100 for achieving and maintaining spacing between aircraft in accordance with an embodiment of the present disclosure. In block 102, an application or module for achieving and maintaining spacing between aircraft may be activated for the spacing operation. The application may be activated by selection by a pilot of a spacing feature in a Flight Management System (FMS), a Flight Management Function (FMF) or an ADS-B application or similar flight deck tool. The spacing application or spacing mode function may also be activated graphically similar to that described herein by the pilot selecting a lead aircraft in conjunction with any of the selection means or tools previously mentioned.

In block 104, information related to a lead aircraft may be received by a following aircraft employing the application or module for achieving and maintaining spacing between aircraft. The information related to the lead aircraft may include but is not necessarily limited to an identification of the lead aircraft, a compass heading the lead aircraft is flying, an airspeed of the lead aircraft, an altitude of the lead aircraft as well as any other parameters related to the lead aircraft that may permit the following aircraft to determine the spacing and to achieve and maintain the spacing from the lead aircraft. The information related to the lead aircraft may be received from an Air Traffic Control (ATC) ground station, from another source, such as the lead aircraft, or both. The following aircraft may also receive a required, assigned or requested spacing to be achieved and maintained relative to the lead aircraft. The required or requested spacing may be a geographic and/or slant distance to be maintained from the lead aircraft or a time spacing from the lead aircraft. The time spacing may be defined as a time duration for the following aircraft to fly directly to a current geographic location of the lead aircraft based on a predetermined set of parameters. The predetermined set of parameters may include but is not necessarily limited to a current airspeed of the following aircraft, an estimated wind speed and wind direction relative to a flight path and vertical profile of the following aircraft from a current geographic location of the following aircraft to the current geographic location of the lead aircraft.

In block 104, ATC may provide initial instructions to the pilot or flight crew to position the aircraft behind a preceding or lead aircraft at a certain spacing which could be in time or in distance. The initial instructions to the flight crew could be to turn to a certain heading to achieve the assigned spacing or to achieve and maintain the assigned spacing from the lead or preceding aircraft using speed adjustments alone.

In block 106, a determination may be made if an automatic spacing mode of the spacing application has been enabled or activated by the pilot. The FMS may determine if the automatic spacing mode is enabled. If the automatic spacing mode has not been enabled, the method 100 may advance to block 108. In block 108, the pilot will control the aircraft for spacing.

If the automatic spacing mode has been enabled in block 106, the method 100 may advance to block 110. In block 110, a spacing from the lead aircraft may be determined. Determining the spacing between the following aircraft and the lead aircraft may include determining a distance between a geographic location of the lead aircraft and a geographic location of the following aircraft. Determining the spacing may also include determining a flying time from a current geographic location of the following aircraft to a current geographic location of the lead or preceding aircraft based on an airspeed of the following aircraft and any other parameters, such as wind speed and wind direction and any other parameters that may be helpful in determining the flying time or spacing measured in time between the lead aircraft and the following aircraft. Accordingly, the spacing between the aircraft may be determined by distance between the aircraft, time or flying time between the aircraft, or both. As described in more detail herein, the spacing in distance, time or both may be presented on a display in the cockpit or flight back to the pilot along with the required or ATC instructed or assigned spacing.

In block 112, an airspeed may be determined for achieving and maintaining the required, assigned spacing behind the lead aircraft. Additionally, or alternatively, heading changes may also be determined and may be provided to the pilot for maneuvering the aircraft to achieve the required or assigned spacing efficiently. The spacing may be presented to the pilot on a display for the pilot to adjust the airspeed to achieve and maintain the spacing, or the spacing determined may be used to automatically control the engine throttle or throttles of the following aircraft to achieve and maintain the spacing as described herein.

In block 114, an instructed or planned vertical profile or vertical path of the flight plan for controlled descent and landing, Continuous Descent Approach (CDA) or Optimized Profile Descent (OPD) may be received by the following aircraft. The instructed or planned vertical profile may be received from ATC or may come from another source as specified for the particular ATM environment where the aircraft are located. The other source may be an Electronic Flight Bag (EFB) or similar means.

CDA or OPD is a method by which aircraft may approach airports prior to landing. CDA or OPD is designed to reduce fuel consumption and noise compared with a conventional approach and involves maintaining a constant predetermined degree angle of descent (three degrees) during landing, until meeting the Instrument Landing System (ILS). Basically, instead of approaching an airport in a stair-step fashion, throttling down and requesting permission to descend to each new (lower) altitude, OPD allows for a smooth, constant-angle descent to landing. This reduces noise pollution and saves fuel.

In block 116, the spacing application or module may go into spacing mode to automatically control throttle settings to achieve and maintain spacing while maintaining the instructed or planned vertical profile.

In block 118, a determination may be made whether the spacing mode was selected by the pilot to control the throttle or throttles of the engines of the aircraft. If the spacing mode of the application was not selected to control the throttles, the method 100 may advance to block 120. In block 120, a representation of the pilot's own aircraft or the following aircraft and the lead aircraft may be presented on the display in the cockpit or flight deck. The current spacing behind the lead aircraft in distance time or both may be presented on the display along with any other pertinent information, such as waypoints, landmarks or other navigational aids. As illustrated in more detail in the exemplary display in FIGS. 3A and 3B, the spacing may be represented digitally, graphically, or both, or in any other format to assist the pilot in achieving and maintaining the assigned spacing.

In block 122, the throttle controls may be entered manually by the pilot to achieve and maintain the assigned spacing.

If the spacing mode is determined to have been selected to control the throttles in block 118, the method 100 may advance to block 124. In block 124, the FMS spacing mode may fly the aircraft and control the throttles to achieve and maintain the spacing between the lead aircraft and the following aircraft and to also maintain the vertical profile. The spacing may also be presented on the flight deck or cockpit display similar to the exemplary display to be described with reference to FIGS. 3A and 3B.

The geographic location of the lead aircraft in the ATM environment may be continuously tracked. The geographic location of the following aircraft in the ATM environment may also be continuously tracked. The spacing between the lead aircraft and the following aircraft may then be determinable from the geographic location of the lead aircraft and the geographic location of the following aircraft on a continuous basis as both fly through the ATM environment.

The spacing between the lead aircraft and the following aircraft may then be continuously updated by the following aircraft. The current spacing between the lead aircraft and the following aircraft may be continuously presented and updated on the display in the cockpit of the following aircraft. As previously described, the current spacing may be represented by one of a distance between the geographic location of the lead aircraft and the geographic location of the following aircraft, a time difference in flying time between the geographic location of the lead aircraft and the geographic location of the following aircraft, or both.

Determining a time spacing between the aircraft may include calculating a time duration for the following aircraft to fly directly to a current geographic location of the lead aircraft based on a set of parameters. The set of parameters may include but is not necessarily limited to a current airspeed of the following aircraft, an estimated wind speed and wind direction relative to a flight path, a vertical profile of the following aircraft and any other parameters that may be helpful in determining a flying time of the following aircraft from its current geographic location to the current geographic location of the lead aircraft.

The updated spacing in time, distance or both may be continuously presented on the display in the cockpit of the following aircraft. The assigned spacing along with other features similar to those previously described may also be presented in the display to the pilot to assist in achieving and maintaining the assigned spacing.

In block 126, a switch out of the spacing mode may occur upon occurrence of a certain event. Examples of an event when the system may switch out of the spacing mode may include but is not limited to a pilot-initiated switch off of the spacing mode, the arrival at a waypoint or certain geographic location, engagement or activation of a non-spacing flight management mode or other event.

Figure 2:
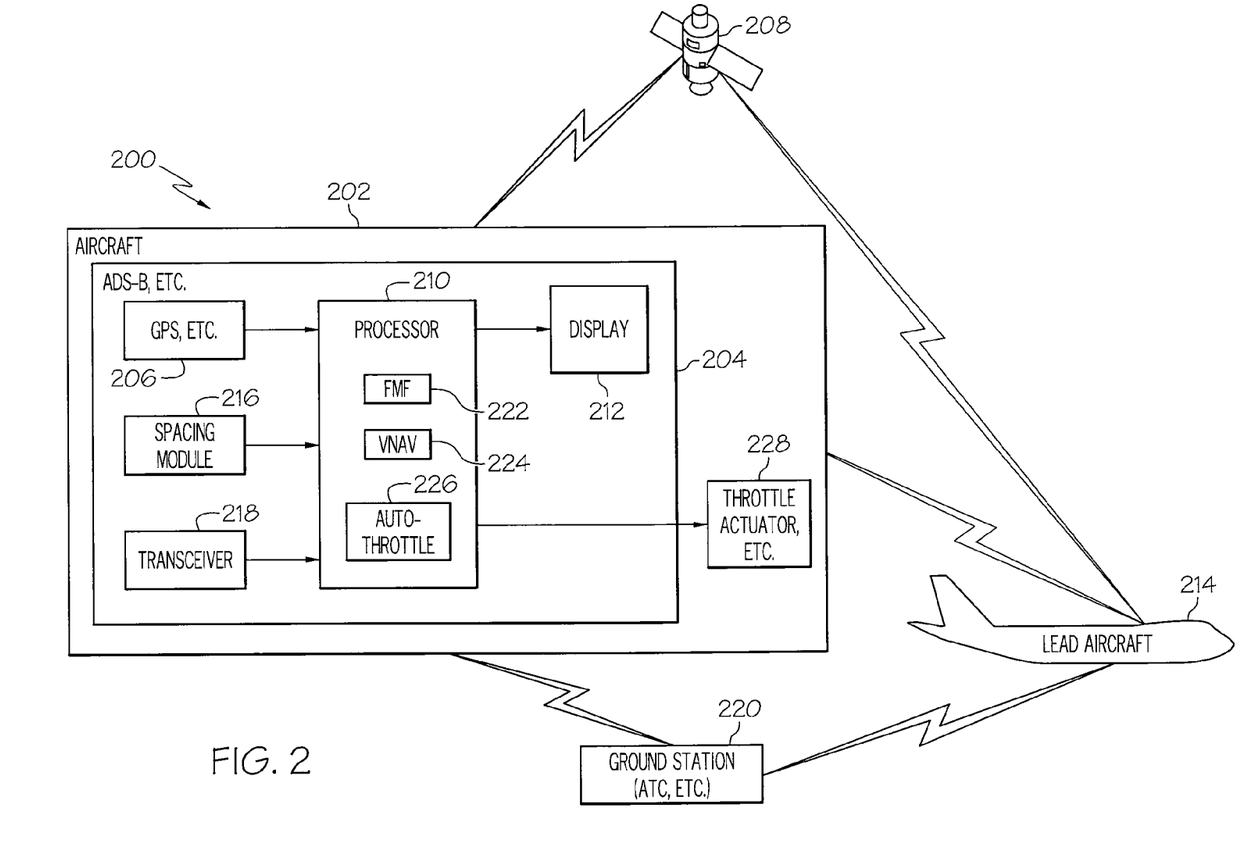
FIG. 2 is a block diagram of an exemplary system for achieving and maintaining spacing between aircraft in accordance with an embodiment of the present disclosure.

FIG. 2 is a block diagram of an exemplary system 200 for achieving and maintaining spacing between aircraft in accordance with an embodiment of the present disclosure. The method 100 may be embodied in and performed by the system 200. The system 200 may be mounted in an airframe of an aircraft 202. The system 200 may include an electronic device 204 for determining flight data or information of other aircraft within a predetermined airspace relative to the pilot's own aircraft 202.

The system 200 or electronic device 204 may be part of an Automatic Dependent Surveillance-Broadcast (ADS-B) type system or may include ADS-B technology or similar technology. ADS-B is a cooperative surveillance technique or technology for air traffic control and related applications. An ADS-B-equipped aircraft may determine its own position using a global navigation satellite system and periodically broadcasts the aircraft's position and other relevant information, such as altitude, airspeed, heading, vertical trend, etc., to ground stations and other aircraft with ADS-B equipment. ADS-B may be used over several different data link technologies, including but not limited to Mode-S Extended Squitter (1090 ES), VHF data link (VDL Mode 4), Universal Access Transceivers (UAT) and similar technologies.

The electronic device 204 is a non-limiting example of an integration of various active systems that may be involved in the spacing mode. One or more of the subsystems of electronic device 204 may be incorporated in one physical avionic/electronic system or in several physical avionic/electronic systems on board the aircraft 202.

The system 200 or electronic device 204 may include a global positioning system (GPS) 206 or similar apparatus for receiving signals or GPS information from GPS satellites 208 or other sources for determining the global location of the aircraft 202. The GPS information may also be used to determine other flight data or information similar to that described herein.

The system 200 or electronic device 204 may include a processor 210 for controlling operation of the system 200 and for performing other functions and operations such as those described with respect to the method 100.

Figure 3A:
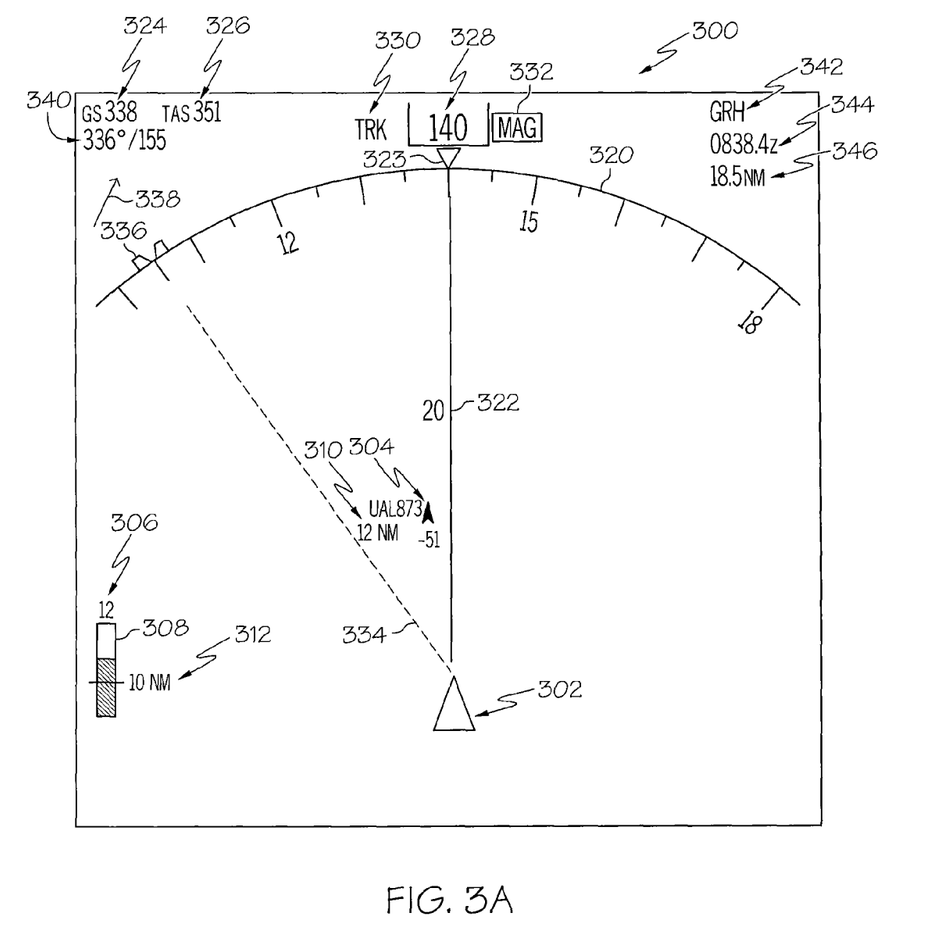
FIGS. 3A and 3B are each an illustration of an exemplary display for achieving and maintaining spacing between aircraft in accordance with an embodiment of the present disclosure.
Figure 3B:
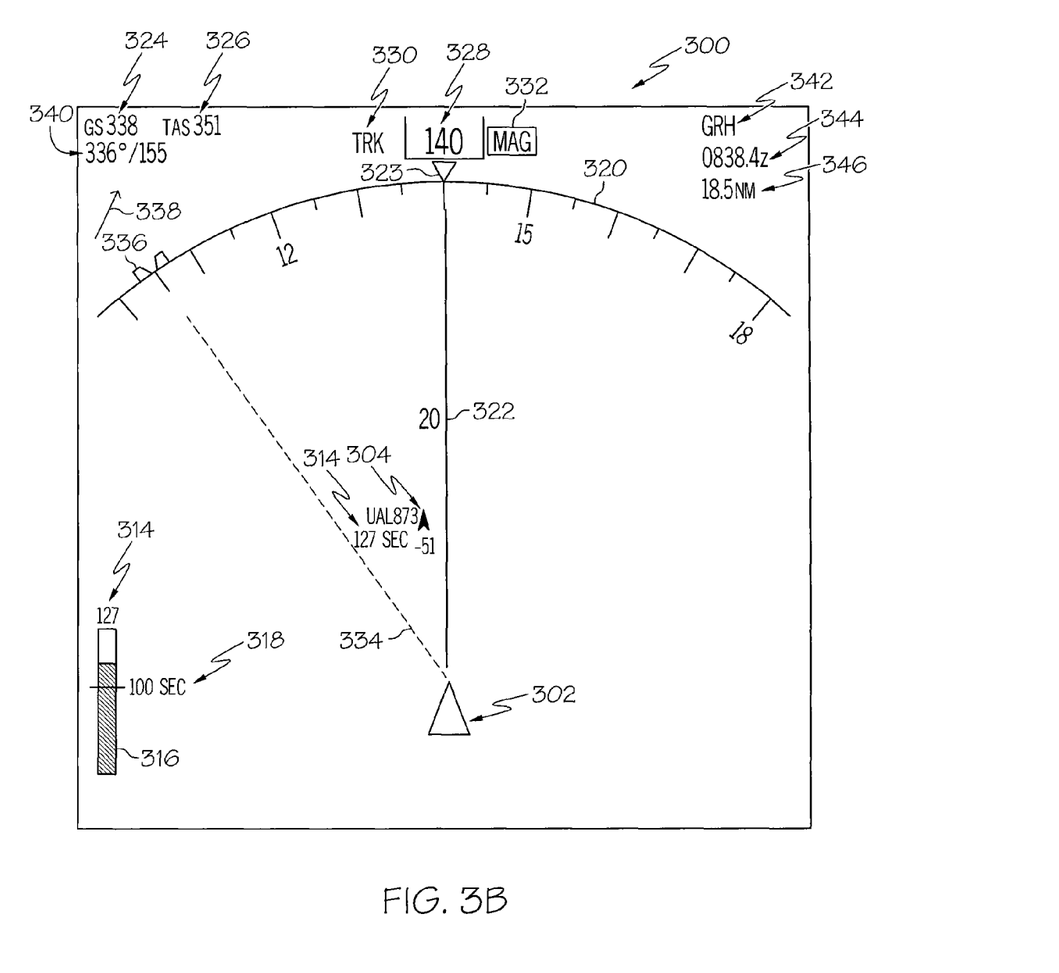

The system 200 or electronic device 204 may also include a display 212 to present a representation of the pilot's own aircraft 202 and a representation of the geographic location of a lead or preceding aircraft 214 within a predetermined airspace or ATM environment, similar to that illustrated in FIGS. 3A and 3B in relation to the pilot's own aircraft 202 (302 in FIGS. 3A and 3B). Other flight information associated with the lead aircraft 214 may also be presented, such as altitude, vertical trend, airspeed, heading, etc.

The system 200 or electronic device 204 may also include a spacing module 216 or application. The spacing module 216 may embody and perform the functions of method 100 for achieving and maintaining spacing between the aircraft 202 and the lead aircraft 214. The spacing module 216 may define a computer readable storage medium or the spacing module 216 may be embodied on a computer readable storage medium similar to that previously described. The spacing module 216 may run or operate on the processor 210.

The system 200 or electronic device 204 may also include a transceiver 218, for sending and receiving location, altitude and other flight data and other information for achieving and maintaining the spacing between aircraft as described herein. The transceiver 218 may send flight data about its associated aircraft 202 to a ground station 220 or air traffic control (ATC) facility and to the lead aircraft 214 and to other traffic or aircraft (not shown in FIG. 2) and may receive flight data and information about the lead aircraft 214 and other aircraft from the lead aircraft 214 and the other aircraft, and from the ground station 220. The flight data or information received may be used for determining spacing, for achieving and maintaining spacing between the aircraft 202 and 214 and for presenting a representation of the aircraft 202 and 214 and the spacing in the display 212 as described herein.

A Flight Management Function (FMF) 222 and Vertical Navigation (VNAV) function 224 may also be operable on the processor 210 to control the flight operation of the aircraft 202 and to control the descent path.

An auto-throttle module 226 may also be operable on the processor 210 to control operation of a throttle actuator or actuators 228. As described herein the spacing module 216 may control operation of the auto-throttle module 226 which in turn controls operation of the throttle actuator or actuators 228 to achieve and maintain the spacing between the aircraft 202 and the lead aircraft 214.

The spacing module 216 or application creates a new "Spacing Mode" that utilizes the throttle/auto-throttle 226 to control the speed guidance of the aircraft 202 for achieving and maintaining distance or time spacing from the lead aircraft 214 while maintaining a predetermined vertical flight path or vertical profile.

This spacing module 216 controls the speed of the aircraft 202 via the auto-throttle module 226 while maintaining Flight Management Function (FMF) 222 control of the descent path via the Vertical Navigation (VNAV) function 224. A speed reversion mode of the FMF is modified for the spacing mode. While the aircraft 202 descends in VNAV 224, the FMF 222 provides guidance commands to maintain a predetermined flight path based on the flight plan entered into the FMF 222 by the pilot or by other means. In an existing mode of operation, the flight path may be constructed based on flying the descent at idle thrust. The speed reversion mode of the FMF 222 is designed to activate the auto-throttle 226 and apply thrust when the aircraft airspeed falls below a preset threshold. With the spacing module 216 described herein, the "Spacing Mode" provides the thrust target and the threshold to activate the throttle 228 or throttle actuators for the spacing function. When the aircraft speed goes below the target speed minus the preset threshold, the FMF 222 speed reversion mode is activated and thrust is applied to get the aircraft 202 up to the speed determined by the "Spacing Mode". Once the speed is attained and the assigned spacing is achieved, the throttle 228 is returned to the idle position to conserve fuel. The throttle adjustments are done while maintaining the vertical path or profile. With this operation, speed brakes or path stretching may be used to slow the airspeed of the aircraft 202.

FIGS. 3A and 3B are each an illustration of an exemplary display 300 for achieving and maintaining spacing between aircraft in accordance with an embodiment of the present disclosure. FIGS. 3A and 3B depict one mode of the display 300 that may be used for navigation, surveillance, and guidance purposed including operating in the spacing mode to maintain the spacing between aircraft as described herein. FIG. 3A is a illustration of the display 300 presenting the spacing as a geographic distance between the pilot's own aircraft 302 and a lead aircraft 304. Accordingly, the display 300 may include a representation of the pilot's own aircraft 302 and the lead or proceeding aircraft 304 that the pilot is to follow and to achieve and maintain an assigned or requested spacing. The current spacing in distance may be presented digitally as illustrated by reference numeral 306 and graphically as illustrated by reference numeral 308 in FIG. 3A. The graphical representation 308 of the spacing may be a bar or bar graph with a portion of the bar graph 308 being filled-in to represent the spacing. The assigned or requested spacing in distance may also be represented digitally and graphically on the display as illustrated by reference numeral 312. The assigned or requested spacing may be a line across the bar graph 308 of the actual spacing with the line being labeled by the assigned or requested spacing as illustrated in FIG. 3A. The current spacing in distance may also be represented digitally on the display proximate to the lead aircraft as illustrated by reference numeral 310. In the example illustrated in FIG. 3A, the spacing between the lead aircraft and the following aircraft or the pilot's own aircraft is displayed as being 12 nautical miles, reference numerals 306, 310. The assigned or required spacing in distance is 10 nautical miles, reference numeral 312 in the example of FIG. 3A. The distance may be represented in nautical miles, statute miles, kilometers or whatever unit of measurement may be appropriate or desired.

In accordance with an embodiment, the spacing application or spacing mode function, as described herein, may also be activated graphically by the pilot selecting a lead aircraft 304 on the display 300. This may be in conjunction with any other selection means that may be associated with a Flight Management System (FMS), a Flight Management Function (FMF) or an ADS-B application or similar flight deck tool.

FIG. 3B is similar to FIG. 3A except that the current spacing and assigned or required spacing are in time rather than distance. As previously discussed, the spacing between the lead aircraft 304 and the following aircraft 302 or the pilot's own ship or aircraft may be represented in terms of geographical distance as illustrated in FIG. 3A, a time or time duration behind the lead aircraft 304, as illustrated in FIG. 3B, or both. The spacing in time may also be illustrated digitally as illustrated by reference numeral 314 in FIG. 3B and graphically as illustrated by reference numeral 316.

The spacing in time in the example of FIG. 3B between the lead aircraft and the following aircraft is displayed as being 127 seconds, reference numeral 314. The assigned spacing in time is 100 seconds, reference numeral 318 in the example of FIG. 3B. The time may be in terms of minutes and seconds.

The display 300 in FIGS. 3A and 3B may also include representations of other features, such as navigational aids, landmarks or the like to assist the pilot.

The filled-in portion of the graphical representation of the spacing 308 and 316 in FIGS. 3A and 3B may be a predetermined color to provide situational awareness to the pilot. For example, the filled-in portion may be green if the current spacing is greater than the assigned spacing and may change to red if the current spacing becomes less than the assigned spacing. Similarly, the digital representation of the current spacing may change colors in FIGS. 3A and 3B if the current spacing becomes less than the assigned spacing, or some other indication may be provided to the pilot.

Those skilled in the art may recognize that the current mode of the exemplary display system 300 illustrated in FIGS. 3A and 3B may be primarily for navigational purposes. Although not shown, the display system 300 can be engaged to display weather systems, terrain, or other data. In a map mode as illustrated, the display system 300 may also show an expanded compass rose 320, range scale 322, a current heading pointer 323, ground speed 324, true airspeed 326, current track 328, track-up indication 330, and magnetic reference 332. Furthermore, the display 300 may show a position trend vector 334, selected heading indicator 336, wind arrow 338, wind direction and speed 340, active waypoint 342, estimated time to active waypoint 344, and current distance to active waypoint 346.

The current spacing in time is one of the parameters that can help a flight crew achieve and then to maintain spacing behind another aircraft. Spacing in time provides a much better situational awareness to the flight crew when it is presented by itself or along with the requested/required spacing in the flight deck. This spacing can be used by the flight crew to plan for and perform the spacing task. If the current spacing is too far off from the required or assigned spacing, the flight crew may consider increasing the power significantly compared to when spacing is close to the required or assigned spacing to achieve spacing in a timely manner. By correctly manipulating throttle/power, the flight crew can save fuel during the "achieve spacing" phase. Also, there might be times when changing the flight path for a short time would aid in attaining the required spacing. Without the display of current spacing, the pilot may not be able to perform the task effectively and efficiently.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A method for achieving and maintaining spacing between aircraft, comprising:
   receiving, by a processor of a following aircraft, information related to a lead aircraft for achieving and maintaining spacing by the following aircraft from the lead aircraft;
   determining, by the processor, spacing of the following aircraft from the lead aircraft;

receiving, by the processor of the following aircraft, a planned vertical profile for descent and landing in a particular air traffic management environment where the aircraft is located;

presenting, by the processor, the spacing of the following aircraft from the lead aircraft on a display in a cockpit of the following aircraft, wherein presenting the spacing comprises presenting a bar graph representing the spacing of the following aircraft from the lead aircraft on the display; and automatically controlling, by the processor, throttle settings to achieve and maintain spacing by the following aircraft from the lead aircraft while maintaining the planned vertical profile of the following aircraft for descent and landing in the particular air traffic management environment in response to an automatic spacing mode being enabled.

2. The method of claim 1, wherein receiving information related to a lead aircraft for achieving and maintaining spacing comprises one of:

receiving, by an aircrew member, the lead aircraft information and entering the lead aircraft information by the aircrew member into a flight management system; and directly receiving the lead aircraft information by the flight management system.

3. The method of claim 1, further comprising a pilot remaining in control of the aircraft in response to the automatic spacing mode not being enabled.

4. The method of claim 1, wherein determining the spacing between the following aircraft and the lead aircraft comprises at least one of:

determining a distance between a geographic location of the lead aircraft and a geographic location of the following aircraft; and determining a flying time between the geographic location of the lead aircraft and the geographic location of the following aircraft based on an airspeed of the following aircraft.

5. The method of claim 1, further comprising presenting the spacing of the following aircraft from the lead aircraft on a display in a cockpit of the following aircraft.

6. The method of claim 1, further comprising:

tracking a geographic location of the lead aircraft;

tracking a geographic location of the following aircraft, wherein the spacing between the lead aircraft and the following aircraft is determinable from the geographic location of the lead aircraft and the geographic location of the following aircraft.

7. The method of claim 6, further comprising:

continuously updating the spacing between the lead aircraft and the following aircraft by the following aircraft; and continuously presenting a current spacing between the lead aircraft and the following aircraft on a display in a cockpit of the following aircraft.

8. The method of claim 7, wherein the current spacing is represented by one of a distance between the lead aircraft and the following aircraft, a time difference in flying time between the geographic location of the lead aircraft and the geographic location of the following aircraft, or both distance and time difference between the lead aircraft and the following aircraft.

9. The method of claim 8, further comprising determining a time spacing between the aircraft by calculating a time duration for the following aircraft to fly directly to a current geographic location of the lead aircraft based on a set of parameters comprising a current air speed of the following aircraft and estimated wind speed and wind direction relative to a flight path and vertical profile of the following aircraft from a current geographic location of the following aircraft to the current geographic location of the lead aircraft.

10. The method of claim 9, wherein continuously presenting the current spacing between the lead aircraft and the following aircraft on the display in the cockpit of the following aircraft comprises presenting the spacing as at least one of the distance between the lead aircraft and the following aircraft, the time spacing between the lead aircraft and the following aircraft, or both the distance and time spacing.

11. The method of claim 10, further comprising continuously updating the presentation of the spacing in distance, time or both, on the display of the following aircraft.

12. The method of claim 11, further comprising presenting a specified spacing between the lead aircraft and the following aircraft in distance, time, or both on the display of the following aircraft.

13. An on-board system for achieving and maintaining spacing between aircraft, the system comprising:

a receiver for receiving information related to a lead aircraft for achieving and maintaining spacing by a following aircraft from the lead aircraft and a planned vertical profile for descent and landing in a particular air traffic management environment where the aircraft is located;

a processor;

a module operating on the processor for determining spacing of the following aircraft from the lead aircraft;

a module operating on the processor for presenting the spacing of the following aircraft from the lead aircraft on a display in a cockpit of the following aircraft, wherein presenting the spacing comprises presenting a bar graph representing the spacing of the following aircraft from the lead aircraft on the display; and an auto-throttle module operating on the processor for automatically controlling throttle settings to achieve and maintain spacing by the following aircraft from the lead aircraft while maintaining the planned vertical profile of the following aircraft for descent and landing in the particular air traffic management environment in response to an automatic spacing mode being enabled.

14. The on-board system of claim 13, further comprising a display for presenting the spacing between the aircraft to a pilot of the following aircraft.

15. The on-board system of claim 14, wherein the display is adapted to present the spacing as a geographic distance between the aircraft, a time spacing between the aircraft, or both.

16. The on-board system of claim 15, wherein the display is adapted to present a specified spacing between the aircraft in geographic distance, time or both.

17. The on-board system of claim 16, wherein the specified spacing is specified by air traffic control.

18. An aircraft comprising:

an airframe;

an on-board system for achieving and maintaining spacing between aircraft, the system comprising:

a receiver for receiving information related to a lead aircraft for achieving and maintaining spacing by the aircraft from the lead aircraft and a planned vertical profile for descent and landing in a particular air traffic management environment where the aircraft is located;

a processor;

a module operating on the processor for determining spacing of the aircraft from the lead aircraft;

a module operating on the processor for presenting the spacing of the following aircraft from the lead aircraft on a display in a cockpit of the following aircraft, wherein presenting the spacing comprises presenting a bar graph representing the spacing of the following aircraft from the lead aircraft on the display; and an auto-throttle module operating on the processor for automatically controlling throttle settings to achieve and maintain spacing by the aircraft from the lead aircraft while maintaining the planned vertical profile of the aircraft for descent and landing in the particular air traffic management environment in response to an automatic spacing mode being enabled.

19. The aircraft of claim 18, further comprising a display for presenting the spacing between the aircraft to a pilot, wherein the display is adapted to present the spacing as a geographic distance between the aircraft, a time spacing between the aircraft, or both, and wherein the display is adapted to present a specified spacing between the aircraft in geographic distance, time or both.

20. A computer program product for achieving and maintaining spacing between aircraft, the computer program product comprising:

a non-transitory computer readable storage medium having computer readable program code embodied therewith, the computer readable program code comprising:

computer readable program code configured to receive by a following aircraft information related to a lead aircraft for achieving and maintaining spacing by the following aircraft from the lead aircraft;

computer readable program code configured to determine spacing of the following aircraft from the lead aircraft;

computer readable program code configured to receive by the following aircraft a planned vertical profile for descent and landing in a particular air traffic management environment where the aircraft is located;

computer readable program code configured for presenting the spacing of the following aircraft from the lead aircraft on a display in a cockpit of the following aircraft, wherein presenting the spacing comprises presenting a bar graph representing the spacing of the following aircraft from the lead aircraft on the display; and computer readable program code configured to automatically control throttle settings to achieve and maintain spacing by the following aircraft from the lead aircraft while maintaining the planned vertical profile for descent and landing in the particular air traffic management environment in response to an automatic spacing mode being enabled.

21. The method of claim 1, further comprising representing at least one of an assigned and a requested spacing by a line across the bar graph corresponding to the at least one of the assigned and the requested spacing.

22. The method of claim 21, further comprising:

representing a fill-in color of the bar graph by one color in response to the spacing between the following aircraft and the lead aircraft being greater than the at least one of the assigned and the requested spacing; and representing the fill-in color of the bar graph by another color in response to the spacing between the following aircraft and the lead aircraft being less than the at least one of the assigned and the requested spacing.

23. The method of claim 1, wherein the automatic spacing mode provides a target speed and a preset threshold to maintain the spacing and the vertical profile of the following aircraft, the method further comprising activating a speed reversion mode in response to a speed of the aircraft falling below the target speed minus the preset threshold to control the throttle settings to regain the target speed and spacing while maintaining the vertical profile.

24. The method of claim 23, further comprising returning the throttle settings to an idle position upon attaining the target speed and spacing.

25. The method of claim 1, wherein the planned vertical profile is received from a source comprising at least one of air traffic control and an electronic flight bag.

* * * * *